United States Patent
Yukimasa (10) Patent No.: US 10,637,524 B2
(45) Date of Patent: Apr. 28, 2020

(54) COMMUNICATION SYSTEM, COMMUNICATION APPARATUS, AND COMMUNICATION METHOD

(71) Applicant: CANON KABUSHIKI KAISHA, Tokyo (JP)

(72) Inventor: Koji Yukimasa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/267,961

(22) Filed: Feb. 5, 2019

(65) Prior Publication Data
US 2019/0245575 A1 Aug. 8, 2019

(30) Foreign Application Priority Data
Feb. 7, 2018 (JP) .................................. 2018-020333

(51) Int. Cl.
*H04B 1/40* (2015.01)
*H01Q 9/04* (2006.01)

(52) U.S. Cl.
CPC ................. *H04B 1/40* (2013.01); *H01Q 9/04* (2013.01)

(58) Field of Classification Search
CPC .................................... H04B 1/40; H01Q 9/04
See application file for complete search history.

(56) References Cited

U.S. PATENT DOCUMENTS

| 9,865,932 B2 | 1/2018 | Yukimasa | |
|---|---|---|---|
| 2013/0194150 A1* | 8/2013 | Korva | H01Q 1/2266 343/848 |
| 2015/0116159 A1* | 4/2015 | Chen | H01Q 5/22 343/702 |
| 2015/0333539 A1* | 11/2015 | Kusunoki | H02J 50/05 307/104 |
| 2019/0140675 A1* | 5/2019 | Willis | H04B 3/46 |

FOREIGN PATENT DOCUMENTS

JP 2009268022 A 11/2009

* cited by examiner

*Primary Examiner* — Freshteh N Aghdam
(74) *Attorney, Agent, or Firm* — Carter & DeLuca & Farrell LLP

(57) ABSTRACT

A communication system comprises a first conductor member in which a first signal line is connected at a connection position other than end portions on a surface of the first conductor member, a second conductor member connected with a second signal line, and a communication control unit that controls wireless communication by electromagnetic coupling between a first coupler including the first conductor member and a second coupler including the second conductor member. A distance between the connection position and a farthest point from the connection position on the surface of the first conductor member is equal to or less than a quarter wavelength corresponding to a signal to be used in communication by the communication control unit.

19 Claims, 9 Drawing Sheets

COMMUNICATION SYSTEM, COMMUNICATION APPARATUS, AND COMMUNICATION METHOD

BACKGROUND OF THE INVENTION

Field of the Invention

The invention relates to a wireless communication system for performing communication by electromagnetic coupling.

Description of the Related Art

In recent years, a near field wireless communication system for communicating by electromagnetic coupling among a plurality of communication couplers brought close to each other has been researched and developed. In this communication system, adopting a configuration in which a digital baseband signal is transmitted/received without modulation enables to simplify circuit configurations and communicate at high speed and with low latency. Japanese Patent Laid-Open No. 2009-268022 discloses a near field wireless communication system in which a transmit antenna and a receive antenna are brought close and opposite to each other and arranged, and data transmission is performed by utilizing electromagnetic coupling in a near field generated between respective slot transmission lines of both the antennas.

In the wireless communication system for communicating by the electromagnetic coupling, there is a problem in which when the communication signal become high-speed, adjacent waveforms of a reception signal interfere with each other, and a communication error is likely to occur.

SUMMARY OF THE INVENTION

According to one aspect of the present invention, there is provided a communication system, comprising: a first conductor member in which a first signal line is connected at a connection position other than end portions on a surface of the first conductor member; a second conductor member connected with a second signal line; and a communication control unit for controlling wireless communication by electromagnetic coupling between a first coupler including the first conductor member and a second coupler including the second conductor member, wherein a distance between the connection position and a farthest point from the connection position on the surface of the first conductor member is equal to or less than a quarter wavelength corresponding to a signal to be used in communication by the communication control unit.

According to another aspect of the present invention, there is provided a communication apparatus, comprising: a conductor member in which a signal line is connected at a connection position other than end portions on a surface of the conductor member; and an input unit for inputting a signal to the conductor member via the signal line such that a signal is transmitted wirelessly from a first coupler including the conductor member to a second coupler by electromagnetic coupling, wherein a distance between the connection position and a farthest point from the connection position on the surface of the conductor member is equal to or less than a quarter wavelength corresponding to a signal to be inputted from the input unit.

According to another aspect of the present invention, there is provided a communication method for performing communication by using a first conductor member including a first signal line connected at a connection position other than end portions on a surface of the first conductor member, and a second conductor member connected with a second signal line, the method comprising: controlling communication to control wireless communication by electromagnetic coupling between a first coupler including the first conductor member and a second coupler including the second conductor member, wherein a distance between the connection position and a farthest point from the connection position on the surface of the first conductor member is equal to or less than a quarter wavelength corresponding to a signal to be used in controlling the communication.

Further features of the present invention will become apparent from the following description of exemplary embodiments with reference to the attached drawings.

DESCRIPTION OF THE EMBODIMENTS

Before explaining embodiments according to the invention, problems in a near field wireless communication system will be further explained.

Figure 1A:
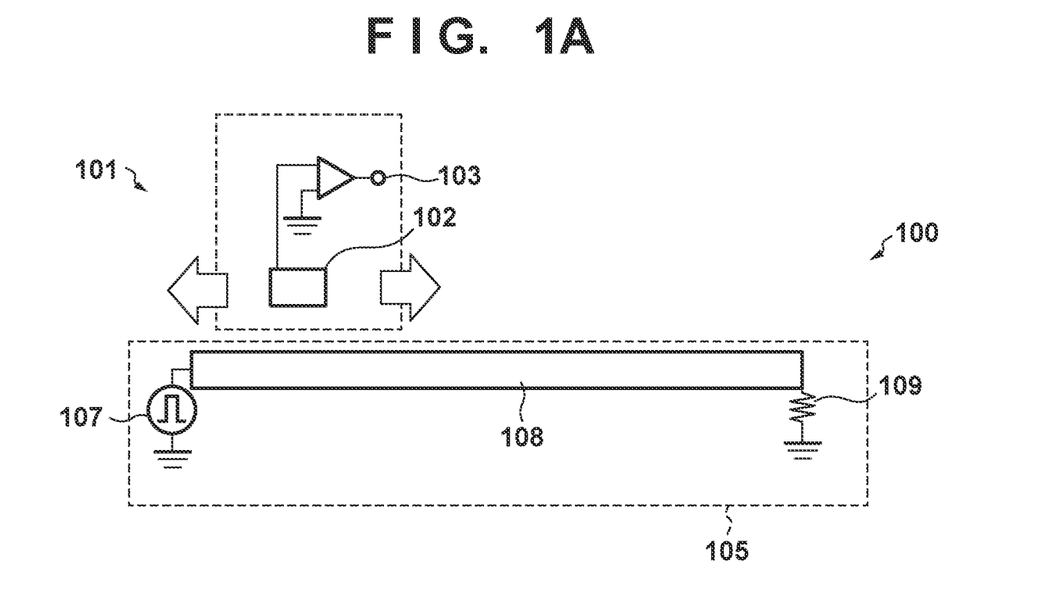
FIGS. 1A and 1B are diagrams for explaining signal detection in a near field wireless communication system.
Figure 1B:
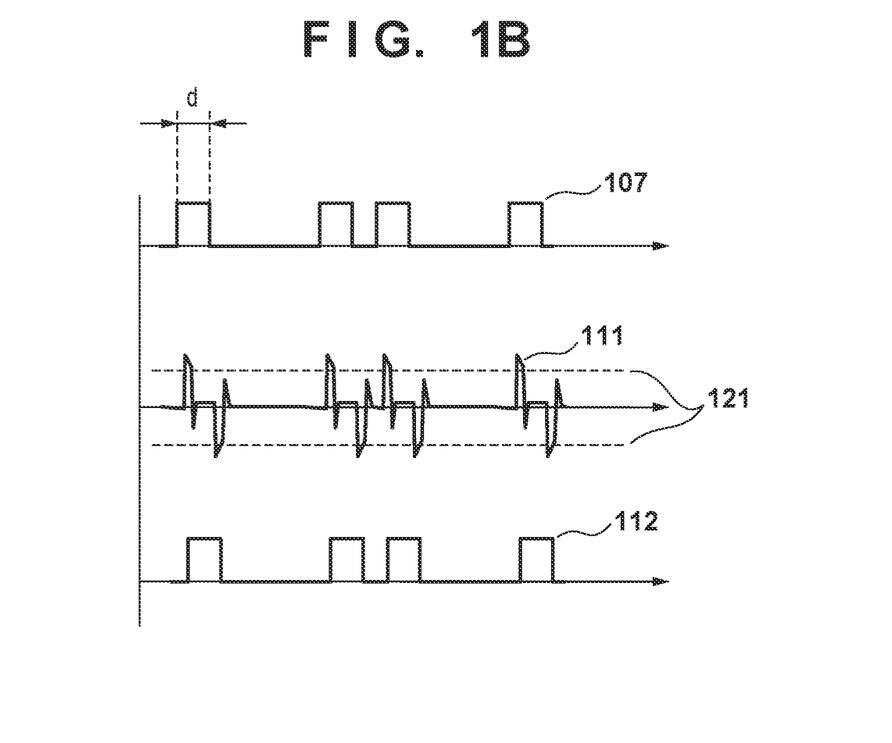

FIGS. 1A and 1B are diagrams for explaining signal detection in a near field wireless communication system. In FIG. 1A, a communication system 100 includes a reception coupler 101 and a transmission coupler 105. The transmission coupler and the reception coupler communicate with each other by electromagnetic coupling. The electromagnetic coupling includes both electric field coupling and magnetic field coupling. That is, wireless communication between the couplers may be performed by the electric field coupling or by the magnetic field coupling, or by both the electric field coupling and the magnetic field coupling. However, in embodiments described later, the transmission coupler functions as a transmission line, the reception coupler functions as an electric field coupler (an electrode coupled with the transmission coupler by an electric field coupling), and thus a case in which communication is performed by the electric field coupling will be focused and described. An conductor 102 of the reception coupler 101 and a conductor 108 of the transmission coupler 105 are brought close and opposite to each other, and the communication system 100 is capable of relatively moving the reception coupler 101 in an arrow direction in the figure (direction parallel to a surface of the transmission coupler 105) in a state of being brought close and opposite to the transmission coupler 105. For example, an unillustrated movement controlling unit is capable of moving at least one of a conductor 102 and a conductor 108 such that a position of the conductor 102 with respect to the conductor 108 in a predetermined direction changes. In the reception coupler 101, the conductor 102 is connected with a signal terminal 103 via a signal line and an amplifier. In the transmission coupler 105, a digital signal 107 (square signal) is inputted to an end portion of the conductor 108 without modulation. The other end portion of the conductor 108 is connected with a terminating resistor 109.

Next, a receiving operation by the reception coupler 101 will be explained with reference to FIG. 1B. In response to inputting the digital signal 107, a reception signal 111 (time-differentiated signal of the digital signal 107) is obtained from the signal terminal 103 of the reception coupler 101. A comparator of the reception coupler 101 (not illustrated) obtains a restoration signal 112 from the reception signal 111 based on a threshold value 121.

In the near field wireless communication system, when the transmission signal becomes high-speed, a pulse width d of a square wave of the digital signal (see FIG. 1B) shortens, adjacent time-differentiated waveforms of the reception signal interfere with each other, and thus it is difficult to detect rises and falls. In particular, when a size of the conductor 102 of the reception coupler 101 is large, the time-differentiated waveforms of the reception signal become dull and thus the interference is likely to occur.

In general, the rises and the falls of the reception signal are, as illustrated in FIG. 1B, detected based on the threshold value of the comparator. In other words, when a reception signal level becomes high, and exceeds the threshold value of the comparator, and thus it is possible to detect the rises and the falls. In order to increase the reception signal level, the reception coupler needs to be larger. On the other hand, in order to communicate at high speed, that is, in order to receive a high-frequency signal, the reception coupler needs to be smaller such that the adjacent waveforms of the reception signal do not interfere with each other.

As described above, when precise detection of the rises and the falls of the reception signal in the high speed communication is attempted, both the above requirements need to be satisfied, but it is difficult for the conventional technology to simultaneously satisfy both the requirements. Thus, in reception couplers according to the following embodiments, a connection position of a signal line in a conductor is configured such that, a distance between the connection position and an arbitrary end point on a periphery of the conductor of the reception coupler, that is, a farthest point that is a farthermost point from the connection position in the conductor, is equal to or less than a quarter wavelength corresponding to a frequency to be used for communication. Accordingly, it is possible to, while keeping a size of the conductor of the reception coupler, receive a high-frequency signal with sharp time-differentiated waveforms, compared to a conventional reception coupler in which a connection position is on an end portion.

In the following, embodiments according to the invention will be explained in detail with reference to the drawings. Note that, in configurations described in the following embodiments are mere examples, and the invention is not limited to the illustrated configurations. Additionally, in all figures for explaining the embodiments, a common constituent element is assigned an identical reference numeral, and a repetitive description will be omitted.

<First Embodiment>

Figure 2:
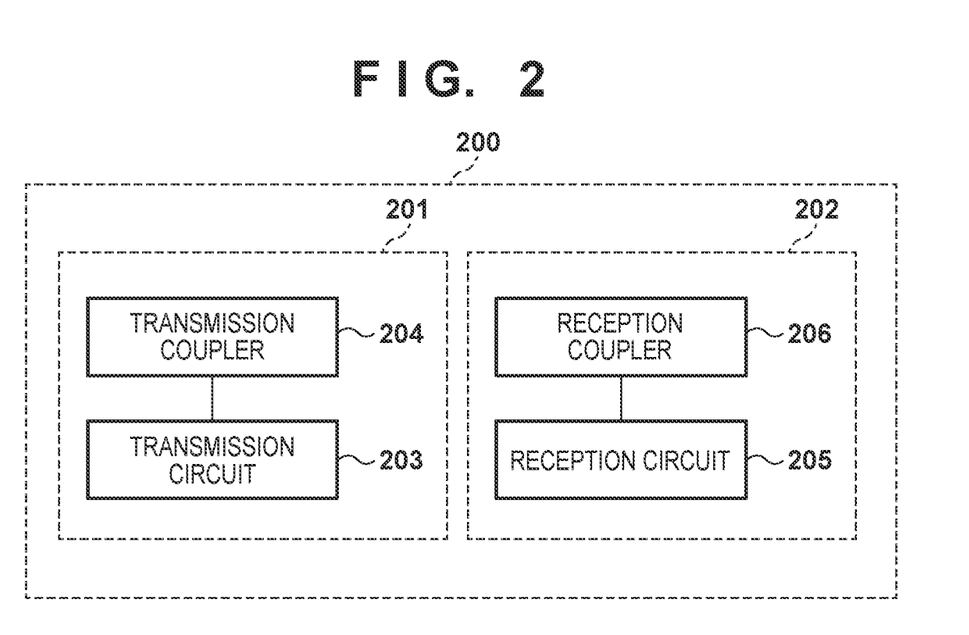
FIG. 2 is a configuration diagram of a communication system 200 according to a first embodiment.

FIG. 2 is a configuration diagram of a communication system 200 according to a first embodiment. The communication system 200 includes a transmitter 201 including a transmission circuit 203 and a transmission coupler 204, and a receiver 202 including a reception circuit 205 and a reception coupler 206.

The transmitter 201 transmits a digital signal generated by the transmission circuit 203 via the transmission coupler 204. The receiver 202 receives a signal outputted from the reception coupler 206 via a signal line 215 at the reception circuit 205, and forms a signal waveform to obtain a restoration signal. That is, the communication system 200, by using the transmission circuit 203 and the reception circuit 205, controls wireless communication by electromagnetic coupling between the transmission coupler 204 and the reception coupler 206. In the communication system 200 in the present embodiment, a digital baseband signal containing frequency components in a wide band from the transmitter 201 is directly transmitted to the receiver 202 by utilizing electric field coupling in a short range non-contact manner. A baseband scheme is a scheme which does not need modulation or demodulation of an electric signal, and thus it is possible to reduce a circuit dimension and communicate with low latency. However, a communication scheme is not limited thereto, and for example, carrier communication may be performed by modulating a carrier wave to be transmitted from a transmission coupler to a reception coupler.

Figure 3A:
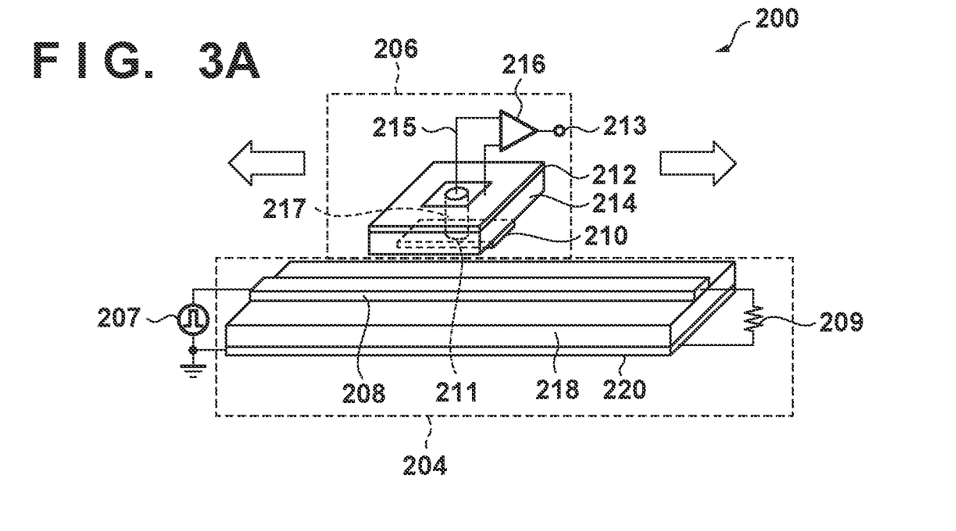
FIGS. 3A to 3D are configuration diagrams of a transmission coupler and a reception coupler according to the first embodiment.
Figure 3B:
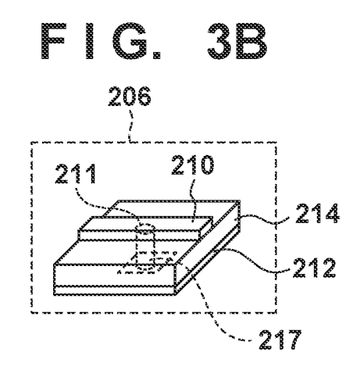
Figure 3C:
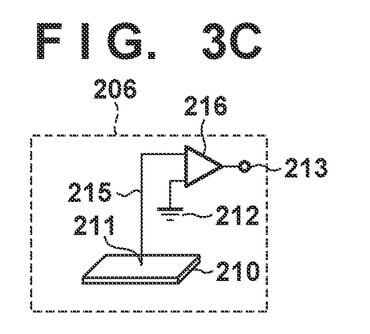
Figure 3D:
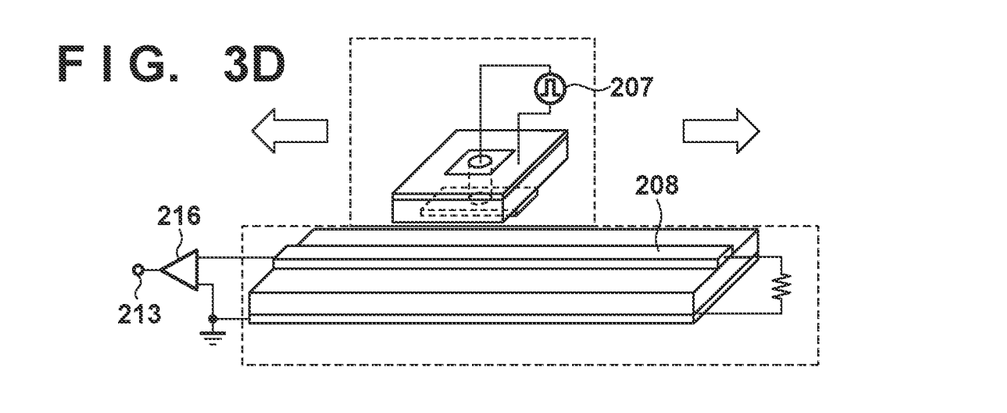

FIGS. 3A to 3D are configuration diagrams of a transmission coupler and a reception coupler according to the first embodiment. FIG. 3B is the diagram in which the reception coupler 206 in FIG. 3A is vertically reversed (partially omitted), and FIG. 3C is the diagram in which a configuration of the reception coupler 206 in FIG. 3A is simplified. FIG. 3D will be described later. In FIG. 3A, the transmission coupler 204 includes a conductor 208 having a long and thin shape and extending in a predetermined direction, a substrate 218, a ground 220 generating a reference potential, and a terminating resistor 209. A digital signal 207 generated by the transmission circuit 203 is inputted to one end of the conductor 208 via a signal line. The other end of the conductor 208 is connected with the ground 220 via the terminating resistor 209. A resistance value of the terminating resistor 209 is 50Ω, but is not limited to 50Ω and may be another resistance value.

The reception coupler 206 includes a conductor 210, a ground 212 generating a reference potential, and a substrate 214. Additionally, a signal terminal 213 of the reception coupler 206 is an output terminal of an amplifier 216 connected with the signal line 215 and the ground 212. The signal line 215 is connected with the conductor 210 via a via 217. Note that, in the present embodiment, the signal line 215 is connected with the conductor 210 via the via 217, but is not limited thereto. For example, a through hole may be provided instead of the via 217, and as illustrated in FIG. 3C, the signal line 215 may be directly connected with the conductor 210. That is, as a signal line for extracting a signal from the conductor 210, for example, a configuration formed with the via 217 and the signal line 215, or a configuration formed only with the signal line 215 may be adopted.

A connection position 211 to be a position from which a signal from the conductor 210 is extracted is a position to which the above-described signal line is connected, that is, a position on which the via 217 or the signal line 215 is connected with the conductor 210. The connection position 211 of the signal line 215 on the conductor 210 is positioned such that a distance from the connection position 211 to a farthest end portion (that is a periphery of the conductor 210) on a surface of the conductor 210 is equal to or less than a quarter wavelength of a transmission signal used for this communication system. Here, a length of the conductor 210 is longer than a quarter wavelength of the transmission signal. That is, the connection position 211 exists on a position other than end portions on the surface of the conductor 210. In this example, the connection position 211 is positioned substantially on a center of the conductor 210. In this way, setting the connection position on the center of the conductor makes it possible to correctly receive the transmission signal with a high frequency without reducing a size of the conductor 208. Additionally, from another perspective, it is possible to increase the size of the conductor 208 while reception precision of a high-frequency signal is maintained, and thus this is advantageous from an aspect of a reception level.

Further, the transmission coupler 204 and the reception coupler 206 are positioned to be brought close and opposite to each other, and the reception coupler 206 can relatively move along a longitudinal direction (arrow direction in FIG. 3A) while maintaining a state of being brought close and opposite to the transmission coupler 204.

Figure 4:
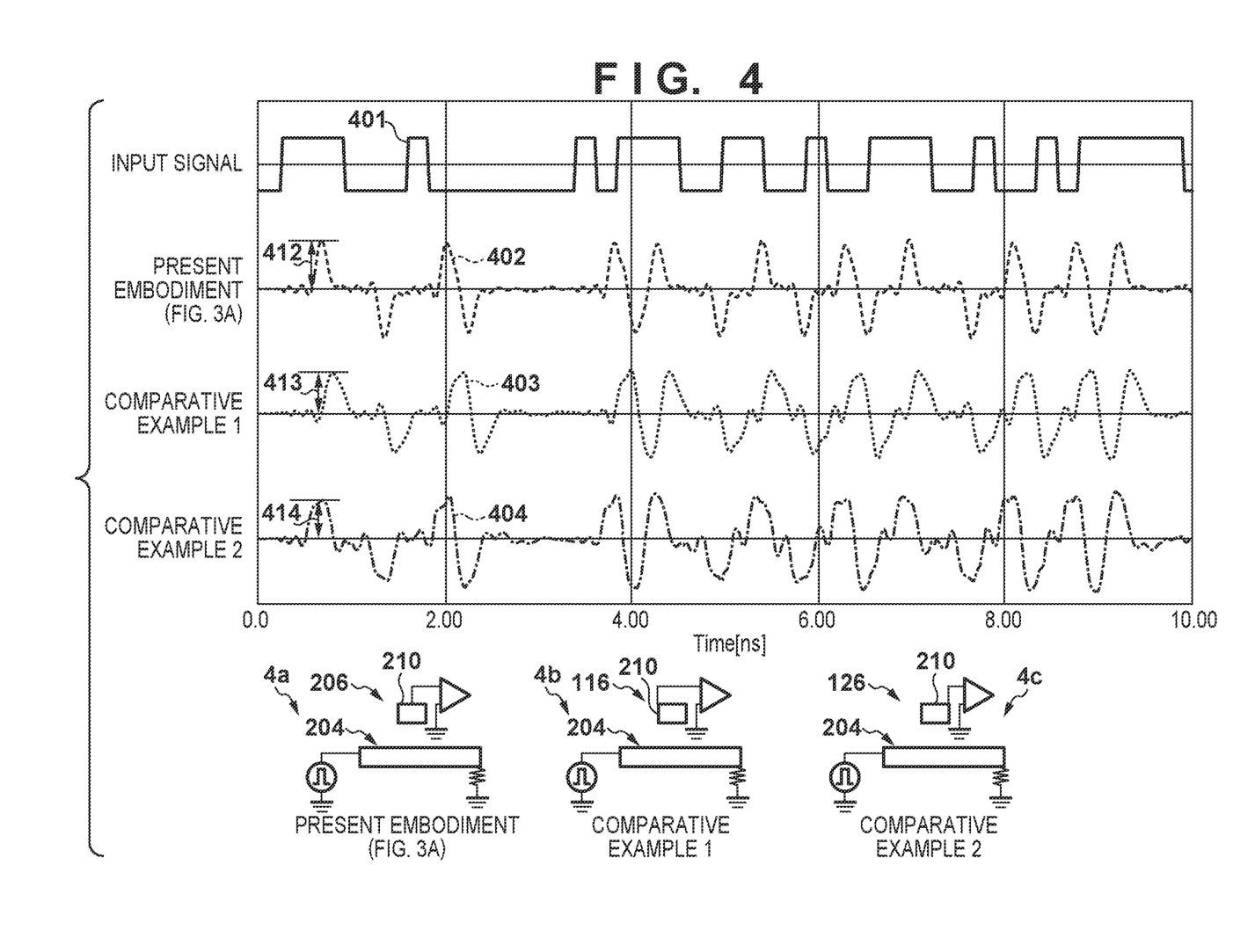
FIG. 4 is a diagram illustrating a simulation result of 5 Gbps communication.

FIG. 4 is a diagram illustrating a simulation result of 5 Gbps communication. In FIG. 4, FIG. 4a illustrates the communication system according to the first embodiment, and FIG. 4b and FIG. 4c illustrate communication systems according to a first and second comparative examples, respectively. 402, 403, and 404 are reception signals obtained from the communication systems illustrated in FIGS. 4a, 4b, and 4c, respectively.

An input signal 401 forms a square wave. Note that, the square wave is a composition signal of sine waves with an infinite number of frequency components. In the communication system in FIG. 4a, when the input signal 401 is inputted to the transmission coupler 204, the reception signal 402 is outputted from the signal terminal 213 of the reception coupler 206. This reception signal 402 is compared with the threshold value as explained in FIG. 1B in the reception circuit 205, is formed as a square wave, and thus is demodulated as a signal with an identical waveform to the input signal 401.

FIG. 4b and FIG. 4c illustrate cases in which, in the respective reception couplers 116 and 126, the connection position of the conductor 210 and the signal line is near an end portion of the conductor, and a distance between the connection position and a farthest end portion of a periphery of the conductor of the reception coupler is not equal to or less than a quarter wavelength of a frequency of the input signal 401. Note that, sizes of the respective reception couplers 206, 116, and 126 (conductor 210) illustrated in FIGS. 4a to 4c are identical, and are longer than the quarter wavelength of the frequency. The reception signal 403 indicates a reception signal outputted from the signal terminal when the input signal 401 transmitted by the transmission coupler 204 is received by the reception coupler 116, and the reception signal 404 indicates a reception signal outputted from the signal terminal when the input signal 401 transmitted by the transmission coupler 204 is received by the reception coupler 126.

When the reception signal 402 of the reception coupler 206 is compared with the reception signal 403 of the reception coupler 116 and the reception signal 404 of the reception coupler 126, a reception level 412 of the reception signal 402 is larger than reception levels 413 and 414 of the respective reception signals 403 and 404. Additionally, ringing of the reception signal 402 is smaller than those of the reception signals 403 and 404, and thus it turns out that adjacent symbols are unlikely to interfere with each other in high speed communication.

As described above, by positioning the connection position such that the distance between the connection position and an arbitrary end portion on the periphery of the conductor is equal to or less than the quarter wavelength of the frequency to be used for the communication, the reception coupler is capable of obtaining an input signal with a sharp time-differentiated waveform and at a higher level similar to that of the reception signal 402, even with an identical conductor size.

Note that, in a case of a 5 Gbps signal, since a frequency component of 2.5 GHz is a fundamental wave, a transmission signal is restorable as long as the frequency component of 2.5 GHz is correctly receivable. By extracting a signal from a position for which distances from all end portions of the conductor 210 are within a quarter wavelength of 2.5 GHz (30 mm), a sharper reception signal waveform is obtained, compared to a case in which the distances are equal to or larger than the quarter wavelength of 2.5 GHz (30 mm). Additionally, by reducing the conductor 210 in size, the reception level of the signal lowers, but it is possible to receive further high-frequency components, and obtain a sharper signal waveform. When a 5 GHz harmonic which is an example of a harmonic equal to or higher than 2.5 GHz is received, it is sufficient that the distances between the connection position and all the end portions of the periphery of the conductor are less than the quarter wavelength of 5 GHz (15 mm).

Note that, in the above, explanation is given for communication using a single ended signal as a transmission signal. However, the transmission signal is not limited to the single ended signal, and may be a differential-pair signal. Here a differential-pair signal has a positive signal and a negative signal of communication signal. That is, the transmission circuit 203 may input a differential-pair signal to the transmission coupler 204. When the differential-pair signal is inputted, there are two signal lines for each of a transmission coupler and a reception coupler, there is a potential difference between the signal lines, and thus there is an effect that an error is unlikely to occur. Additionally, in FIG. 3A, the coupler including the conductor 208 is the transmission coupler 204, and the coupler including the conductor 210 is the reception coupler 206, but the couplers used for transmission/reception may be reversely positioned as illustrated in FIG. 3D. In this case, the digital signal 207 is inputted to the conductor 210 from the connection position 211. Further, an end portion of the conductor 208 is a connection position with the signal terminal 213.

<Second Embodiment>

In the first embodiment, a configuration including one transmission coupler and one reception coupler was explained. In a second embodiment, a case in which a plurality of (two) transmission couplers are included will be explained.

Figure 5:
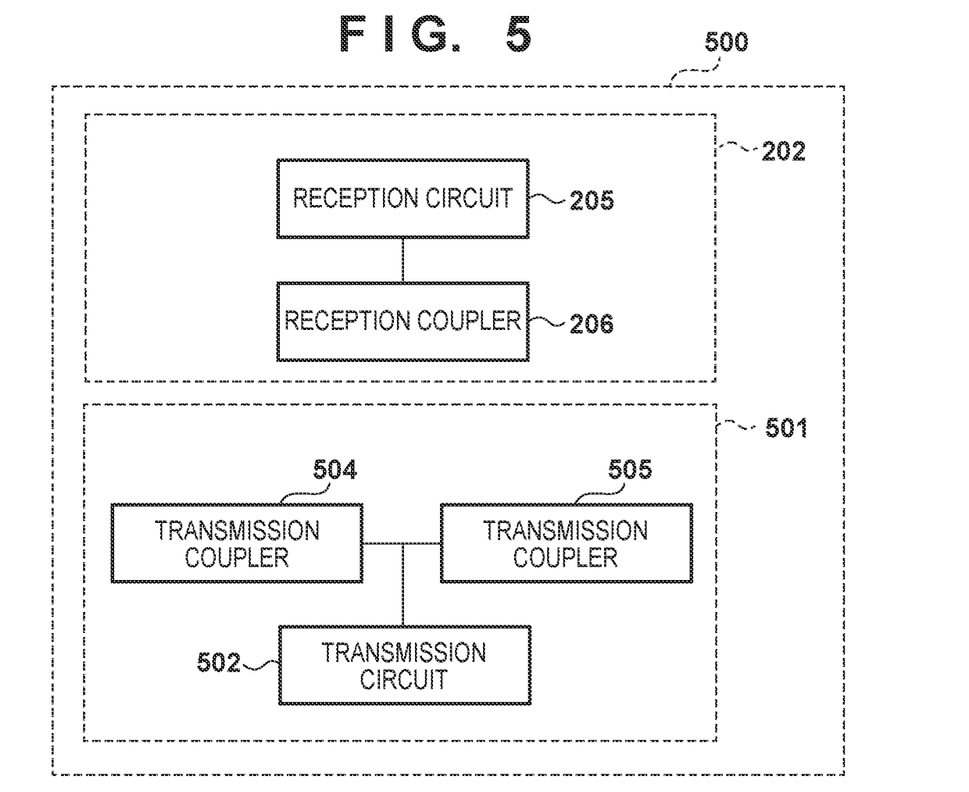
FIG. 5 is a configuration diagram of a communication system 500 according to a second embodiment.

FIG. 5 is a configuration diagram of a communication system 500 according to the second embodiment. The communication system 500 includes a transmitter 501 including a transmission circuit 502 and transmission couplers 504 and 505, and the receiver 202 including the reception circuit 205 and the reception coupler 206. The communication system 500 differs from the communication system 200 according to the first embodiment in that the transmitter 501 includes the two couplers (transmission coupler 504, transmission coupler 505).

Figure 6:
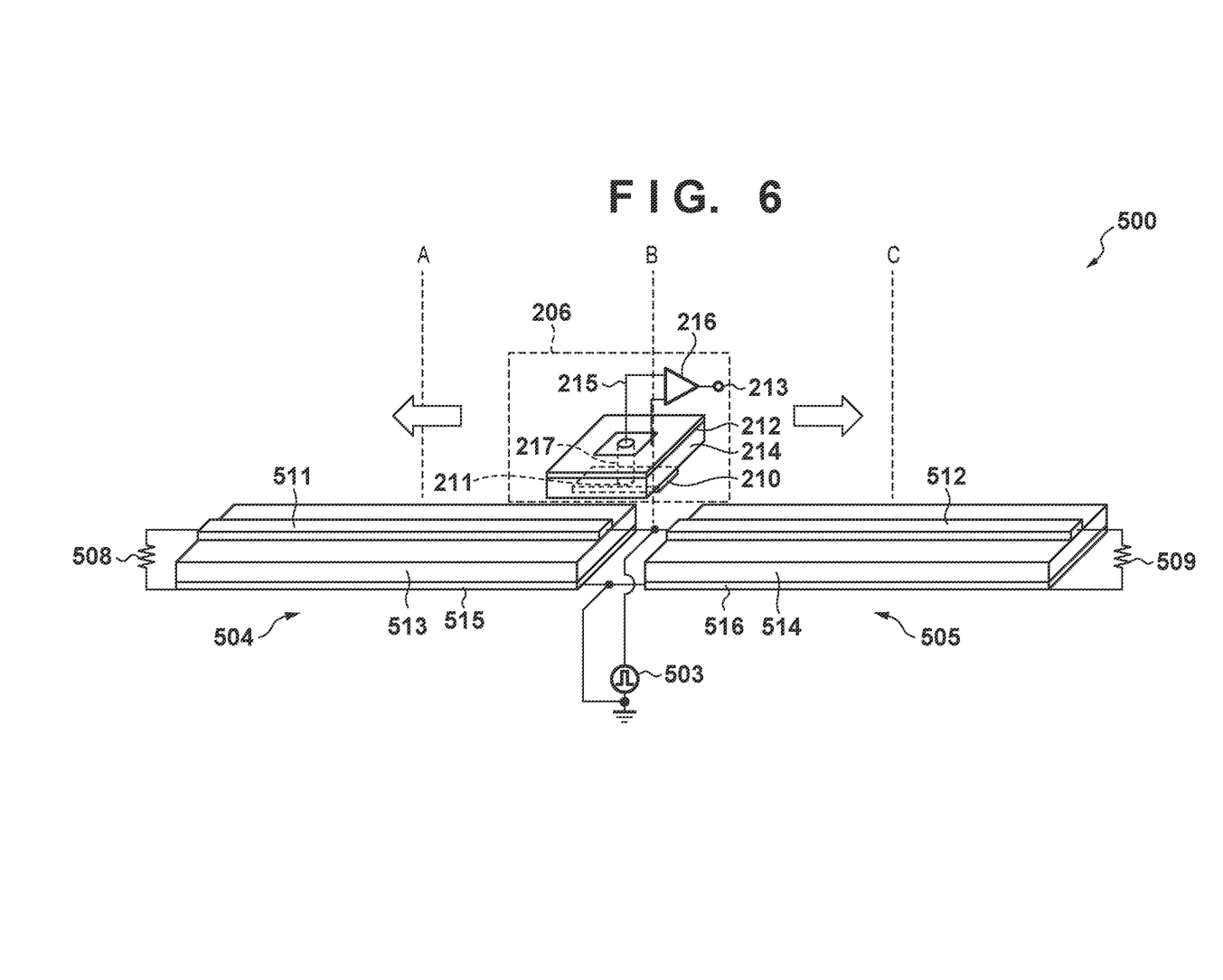
FIG. 6 is a configuration diagram of transmission couplers and a reception coupler according to the second embodiment.

FIG. 6 is a configuration diagram of transmission couplers and a reception coupler according to the second embodiment. The transmission coupler 504 includes a substrate 513, a conductor 511, and a ground 515. Similarly, the transmission coupler 505 includes a substrate 514, a conductor 512, and a ground 516. The transmission couplers 504 and 505 extend in a left-right direction in the figure, and are aligned in the left-right direction. That is, the transmission coupler 504 and the transmission coupler 505 are aligned in a movement direction of the reception coupler 206. However, a distance between an end portion of the transmission coupler 504 and an end portion of the transmission coupler 505 which are opposite to each other is equal to or less than a length of the conductor 210 of the reception coupler 206. Additionally, each of both the opposing end portions is connected with either a signal input or a terminating resistor. A configuration in which one of both the opposing end portions is connected with the signal input and the other is connected with the terminating resistor is not adopted. Note that, the reception coupler 206 has an identical configuration to the configuration explained in the first embodiment, and thus the explanation thereof will be omitted.

A digital signal 503 is branched and inputted between the transmission couplers 504 and 505. The inputted signals are transmitted from a center in FIG. 6 (position on which the end portions of the respective transmission couplers 504 and 505 are opposite to each other) to the respective conductors 511 and 512. Moreover, the signals are terminated at the respective terminating resistors 508 and 509. The reception coupler 206 is relatively movable in an extending direction (arrow direction in the figure) while maintaining a state of being brought close and opposite to the transmission coupler 504 and the transmission coupler 505.

Figure 7:
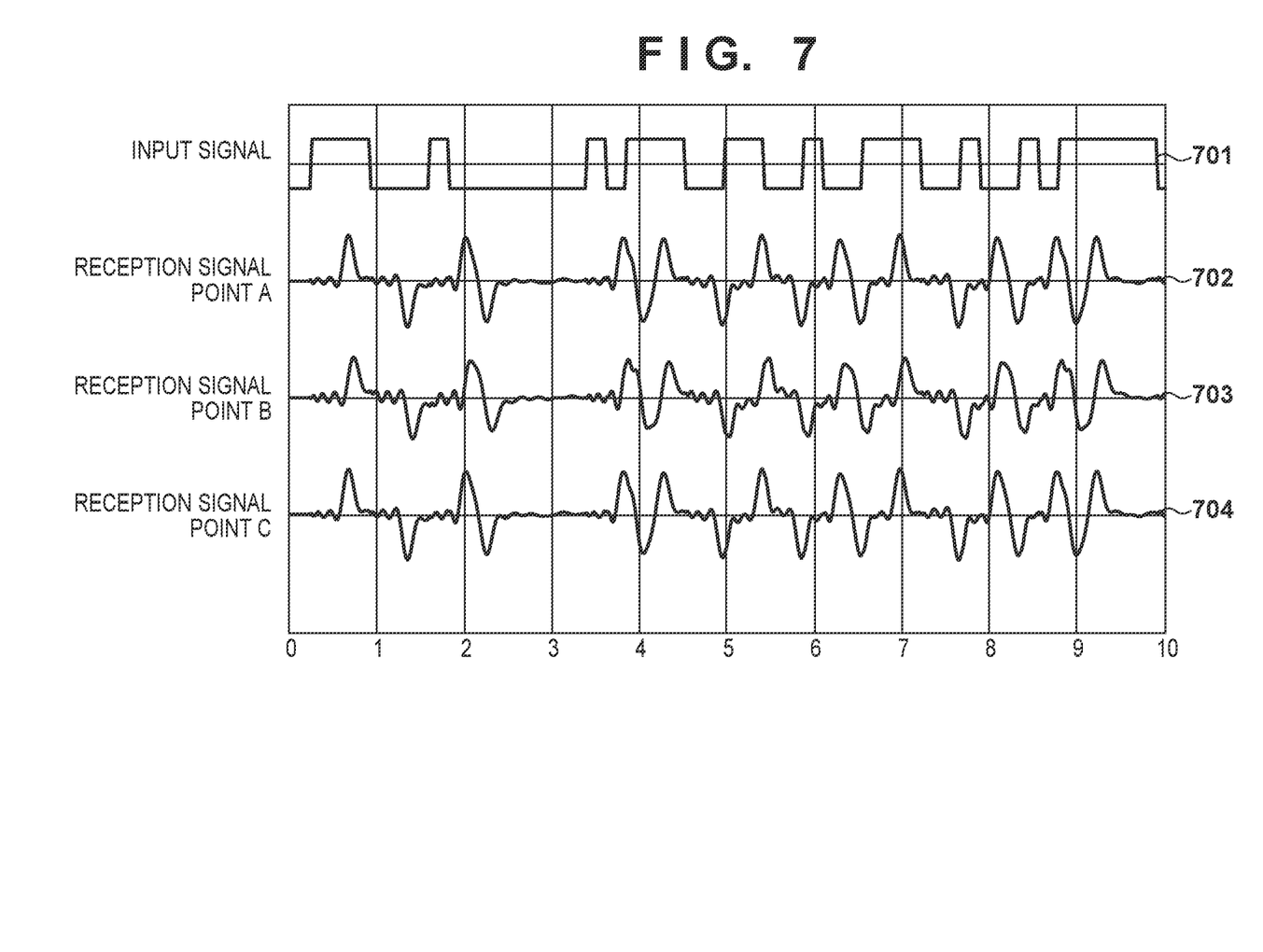
FIG. 7 is a graph illustrating a simulation result of 5 Gbps communication.

FIG. 7 is a graph illustrating a simulation result of 5 Gbps communication by the transmission couplers and the reception coupler illustrated in FIG. 6. Reception signals 702, 703, and 704 indicate signals of which the reception coupler 206 has received the input signal 701 (corresponding to the digital signal 503 in FIG. 6) at points A, B, and C in FIG. 6, respectively. In any case in which the reception coupler 206 is at the point A, B, or C, the reception signal indicates a similarly sharp time-differentiated waveform, and is capable of being demodulated.

In the present embodiment, the input position of the digital signal is at a center, but a configuration in which an input position and a terminating resistor are reversed also exhibits a similar effect as in the present embodiment. That is, the terminating resistors 508 and 509 may be connected at an input position of the digital signal 503 between the transmission coupler 504 and the transmission coupler 505 in FIG. 6, and the connection positions of the respective terminating resistors 508 and 509 in FIG. 6 may be input positions of the digital signal 503. Additionally, in the explanation in the present embodiment, the reception coupler 206 moves, but the transmission coupler 504 and the transmission coupler 505 may move. Further, the number of the transmission couplers is two, but may be three or more. Also in this case, distances among the couplers are equal to or less than a length of a conductor of the reception coupler. Similarly to the first embodiment, a transmission signal may be a differential-pair signal. Additionally, the coupler including the conductor 210 is the reception coupler and the coupler including the conductors 511 and 512 is the transmission coupler, but the reception coupler and the transmission coupler may be swapped.

<Third Embodiment>

Figure 8:
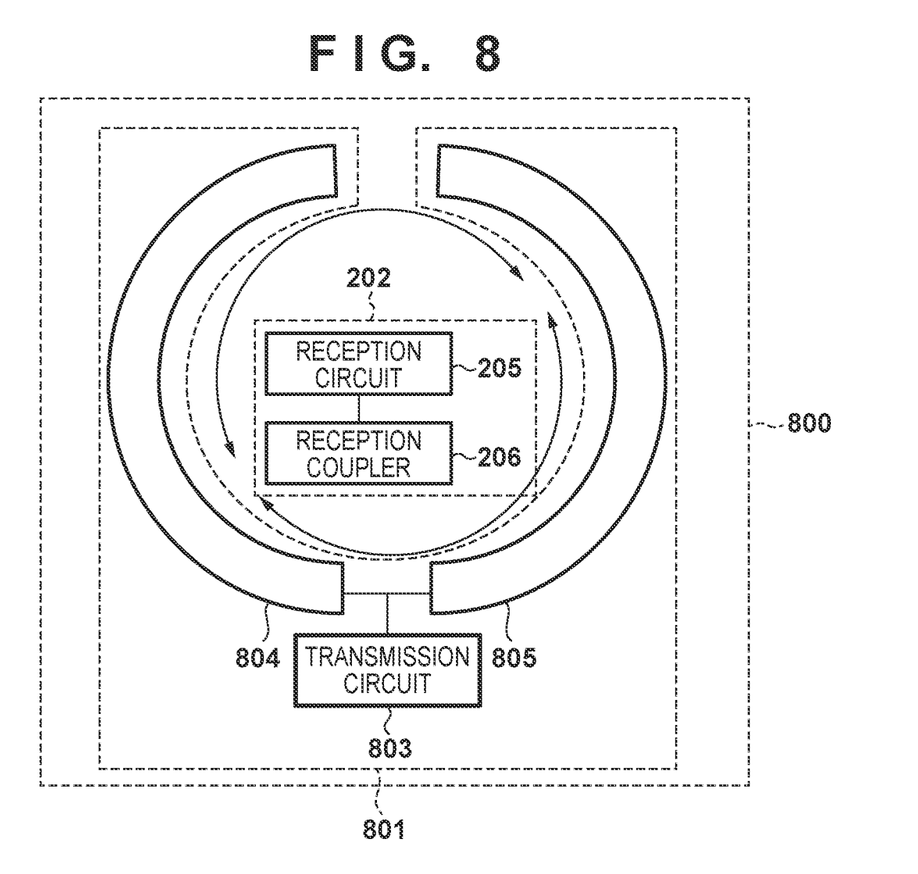
FIG. 8 is a configuration diagram of a communication system 800 according to a third embodiment.

FIG. 8 is a configuration diagram of a communication system 800 according to a third embodiment. The communication system 800 includes a transmitter 801 including a transmission circuit 802 and transmission couplers 804 and 805, and the receiver 202 including the reception circuit 205 and the reception coupler 206. The communication system 800 differs from the communication system 500 according to the second embodiment in that the transmission couplers 804 and 805 of the transmitter 801 are curved such that respective end portions thereof are opposite to each other. The present embodiment illustrates an example in which the two transmission couplers 804 and 805 are arranged in a circular shape.

Figure 9A:
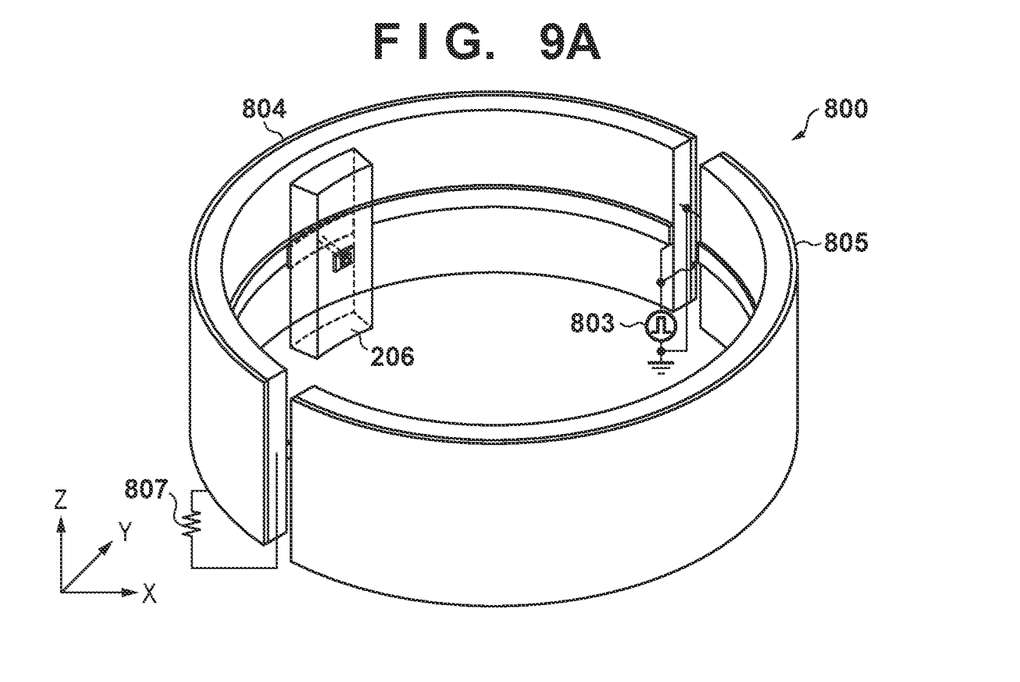
FIGS. 9A and 9B are configuration diagrams of transmission couplers and a reception coupler according to the third embodiment.
Figure 9B:
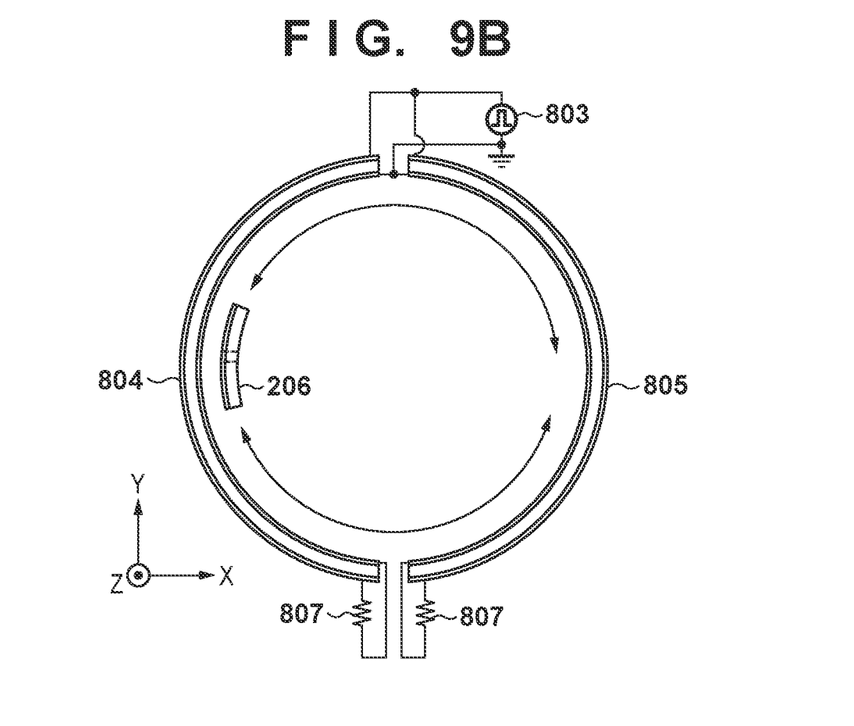

Each of FIGS. 9A and 9B is a configuration diagram of transmission couplers and a reception coupler according to the third embodiment. FIG. 9A is a perspective view and FIG. 9B is a diagram in which FIG. 9A is viewed from a positive direction of a Z axis. The transmission couplers 804 and 805 are aligned in a circumferential direction (longitudinal direction) of circles with an identical diameter, and the reception coupler 206 is positioned in a circumferential direction of concentric circles. Additionally, the reception coupler 206 moves relative to the transmission couplers in an arrow direction (circumferential direction) denoted in FIG. 9B. Further, in FIGS. 9A and 9B, a short sized coupler is positioned inside the circle and long sized couplers are positioned outside the circle, but the positions may be reversed. A digital signal 803 is branched and inputted on one space side between the transmission couplers 804 and 805, and on the other space side, each end portion is terminated with a terminating resistor 807. A distance between an end portion of the transmission coupler 804 and an end portion of the transmission coupler 805 which are opposite to each other is equal to or less than a length of the conductor 210 of the reception coupler 206. The reception coupler 206 has an identical configuration to the configuration explained in the first embodiment, and thus the explanation thereof will be omitted, but may be curved with a curvature factor to a similar extent to the transmission couplers 804 and 805.

By using the above described configuration, the reception coupler 206 is capable of communicating a high-speed signal while rotating. Additionally, similarly to the first embodiment, a transmission signal may be a differential-pair signal, and a similar effect is exhibited even when the transmission coupler and the reception coupler are swapped.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020333, filed Feb. 7, 2018, which is hereby incorporated by reference herein in its entirety.

What is claimed is:

1. A communication system, comprising:
a first conductor member in which a first signal line is connected at a connection position other than end portions on a surface of the first conductor member;
a second conductor member connected with a second signal line; and
circuits for controlling wireless communication by electromagnetic coupling between a first coupler including the first conductor member and a second coupler including the second conductor member, wherein a distance between the connection position and a farthest point from the connection position on the surface of the first conductor member is equal to or less than a quarter of a wavelength of a signal to be used in communication by the circuits.

2. The system according to claim 1, wherein the connection position is a substantially central position on the surface of the first conductor member.

3. The system according to claim 1, wherein the distance is equal to or less than a quarter of a wavelength corresponding to a harmonic of a signal to be used in communication by the circuits.

4. The system according to claim 1, wherein at least one of the first conductor member and the second conductor member is movable such that a position of the second conductor member in a predetermined direction with respect to the first conductor member changes, and
wherein a length of the first conductor member in a predetermined direction is shorter than a length of the second conductor member in the predetermined direction.

5. The system according to claim 4, further comprising:
a third conductor member connected with a third signal line, wherein
the second conductor member and the third conductor member are aligned in the predetermined direction, and
the circuits further control wireless communication by electromagnetic coupling between a third coupler including the third conductor member and the first coupler.

6. The system according to claim 4, wherein the predetermined direction is a direction parallel to a surface of the second conductor member.

7. The system according to claim 4, wherein the predetermined direction is a predetermined circumferential direction.

8. The system according to claim 1, wherein the circuits input a differential-pair signal to the first coupler or the second coupler.

9. The system according to claim 1, wherein the circuits control wireless communication by a baseband scheme via the first coupler and the second coupler.

10. The system according to claim 1, wherein the circuits include:
a transmission circuit for inputting a signal to the first conductor member via the first signal line; and
a reception circuit for receiving a signal outputted from the second conductor member in response to a signal inputted to the first conductor member by the transmission circuit via the second signal line.

11. The system according to claim 1, wherein the circuits include:
a transmission circuit for inputting a signal to the second conductor member via the second signal line; and
a reception circuit for receiving a signal outputted from the first conductor member in response to a signal inputted to the first conductor member by the transmission circuit via the first signal line.

12. The system according to claim 1, wherein
the second coupler functions as an electrode coupled with the first coupler by electric field coupling, and
the first coupler functions as a transmission line.

13. The system according to claim 1, wherein part of the first signal line is connected with the second conductor member.

14. A communication apparatus, comprising:
a conductor member in which a signal line is connected at a connection position other than end portions on a surface of the conductor member; and
an input circuit for inputting a signal to the conductor member via the signal line such that a signal is transmitted wirelessly from a first coupler including the conductor member to a second coupler by electromagnetic coupling, wherein
a distance between the connection position and a farthest point from the connection position on the surface of the conductor member is equal to or less than a quarter of a wavelength of a signal to be inputted from the input circuit.

15. The apparatus according to claim 14, wherein the connection position is a substantially central position on the surface of the conductor member.

16. The apparatus according to claim 14, wherein the distance is equal to or less than a quarter of a wavelength corresponding to a harmonic of a signal to be used in communication by the communications apparatus.

17. A communication method for performing communication by using a first conductor member including a first signal line connected at a connection position other than end portions on a surface of the first conductor member, and a second conductor member connected with a second signal line, the method comprising:
controlling communication to control wireless communication by electromagnetic coupling between a first coupler including the first conductor member and a second coupler including the second conductor member, wherein
a distance between the connection position and a farthest point from the connection position on the surface of the first conductor member is equal to or less than a quarter of a wavelength of a signal to be used in controlling the communication.

18. The method according to claim 17, wherein the distance is equal to or less than a quarter of a wavelength of a harmonic of a signal to be used in controlling the communication.

19. The method according to claim 17, further comprising:
controlling movement to move at least one of the first conductor member and the second conductor member such that a position of the second conductor member in a predetermined direction with respect to the first conductor member changes, wherein
a length of the first conductor member in a predetermined direction is shorter than a length of the second conductor member in the predetermined direction.

* * * * *